US012759711B2

(12) United States Patent
Woodington et al.

(10) Patent No.: US 12,759,711 B2
(45) Date of Patent: Oct. 13, 2026

(54) TRANSLATING AIRCRAFT SEAT

(71) Applicants: Safran Seats GB Limited, Cwmbran (GB); Safran Seats, Plaisir (FR)

(72) Inventors: James Woodington, Cwmbran (GB); Gerald Cotta, Plaisir (FR)

(73) Assignees: Safran Seats GB Limited, Cwmbran (GB); Safran Seats, Plaisir (FR)

( * ) Notice: Subject to any disclaimer, the term of this patent is extended or adjusted under 35 U.S.C. 154(b) by 132 days.

(21) Appl. No.: 18/755,580

(22) Filed: Jun. 26, 2024

(65) Prior Publication Data

US 2025/0002158 A1 Jan. 2, 2025

(30) Foreign Application Priority Data

Jun. 28, 2023 (EP) .................................... 23306054

(51) Int. Cl.
*B64D 11/06* (2006.01)
*A47C 17/12* (2006.01)
*B60N 2/34* (2006.01)

(52) U.S. Cl.
CPC .......... *B64D 11/0641* (2014.12); *A47C 17/12* (2013.01); *B60N 2/34* (2013.01); *B64D 11/0647* (2014.12)

(58) Field of Classification Search
CPC .... B64D 11/0641; B60N 2/34; B60N 2/0224; B60N 2/0284; A47C 17/12; A47C 17/13; A47C 17/132; A47C 17/136
See application file for complete search history.

(56) References Cited

U.S. PATENT DOCUMENTS

| | | | | | |
|---|---|---|---|---|---|
| 1,087,613 | A * | 2/1914 | Sisbower | A47C 17/136 5/17 |
| 5,992,798 | A | 11/1999 | Ferry | |
| 6,059,364 | A * | 5/2000 | Dryburgh | A47C 1/0352 244/118.6 |
| 7,607,732 | B2 * | 10/2009 | Beroth | B60N 2/6054 297/229 |
| 8,087,612 | B2 * | 1/2012 | Park | B64D 11/0641 297/344.1 |
| 8,616,643 | B2 | 12/2013 | Darbyshire et al. | |
| 10,427,794 | B2 | 10/2019 | Erhel | |
| 12,187,437 | B2 * | 1/2025 | Kodati | B64D 11/0641 |
| 2001/0003962 | A1 | 6/2001 | Park et al. | |
| 2022/0144155 | A1 | 5/2022 | Frotz et al. | |

FOREIGN PATENT DOCUMENTS

| | | | |
|---|---|---|---|
| EP | 3385167 | A1 | 10/2018 |
| WO | 2014147449 | A1 | 9/2014 |

OTHER PUBLICATIONS

Europe Appl. No. 23306054.0, Search Report, dated Nov. 20, 2023, 9 pages.

* cited by examiner

*Primary Examiner* — Syed A Islam
(74) *Attorney, Agent, or Firm* — Kilpatrick Townsend & Stockton LLP

(57) ABSTRACT

The present invention provides an aircraft seat unit comprising a backshell and a seat, the seat having a seat pan portion connected to a back portion, wherein the seat is configured to slide within the backshell between an upright configuration, where a passenger can sit on the seat pan portion in a sitting position with their back supported by the back portion of the seat, and a bed configuration, where the passenger can lie on the seat pan and seat back portions.

13 Claims, 7 Drawing Sheets

TRANSLATING AIRCRAFT SEAT

CROSS-REFERENCE TO RELATED APPLICATION

The present application claims priority to Europe Patent Application No. 23306054.0, filed on Jun. 28, 2023, the entire contents of which are herein incorporated by reference in their entirety for all purposes.

FIELD OF THE INVENTION

The present invention concerns an aircraft seat unit comprising a translating seat. More particularly, but not exclusively, this invention concerns a seat that slides from an upright configuration to a bed configuration. The invention also concerns an aircraft seat arrangement comprising the aircraft seat unit, and a method of using the same.

BACKGROUND OF THE INVENTION

When passengers are flying long-haul, it is often desirable to be able to sleep when travelling. Prior art seat arrangements include seats that that are able to move from an upright seated configuration to a bed configuration. This gives the passenger the option to sit upright with the seat unit in the seated configuration for activities such as eating or reading, and to lie-down with the seat unit in the bed configuration in a more natural position for sleeping. However, such seat units can take up significant space within an aircraft, which means fewer passengers per flight.

Additionally, aircraft seat units typically comprise a number of parts, for example a table or personal console, personal smart screen, communication unit, integrated sound system, cushions, blankets, control unit, and actuators, to improve the passenger's experience when flying for a long period of time. However, these additional parts may increase the overall weight of an aircraft, thereby reducing fuel efficiency.

The present invention seeks to provide an improved aircraft seat unit with a translating seat.

SUMMARY OF THE INVENTION

The present invention provides an aircraft seat unit comprising a backshell and a seat, the seat having a seat pan portion connected to a back portion, wherein the seat is configured to slide within the backshell between an upright configuration, where a passenger can sit on the seat pan portion in a sitting position with their back supported by the back portion of the seat, and a bed configuration, where the passenger can lie on the seat pan and seat back portions.

The invention may have fewer parts than conventional seat units, potentially taking up less space on an aircraft. Advantageously, the invention provides an aircraft seat unit which may be lighter than conventional seat units. Also, the present invention provides an aircraft seat that can be translated between the upright seated configuration and a bed configuration quickly and simply.

The backshell is located to a non-passenger side of the back portion of the seat. The backshell may provide the passenger with privacy in the aircraft cabin. The use of the term "backshell" does not suggest a specific orientation of the seat unit. The seat unit may be forward facing or angled to a line of flight direction. The aircraft seat unit may comprise a console unit such as a table. The console may be integrated with the backshell. The backshell may comprise a rear curved panel to support the back portion of the seat. The curved panel may be in contact with the non-passenger side of the back portion of the seat. The curved panel may comprise a plastics material. The curved panel may comprise other materials, for example fabrics such as felt, leather, cotton, or nylon. Some preferable materials may allow a smoother translation of the seat within the backshell.

Space occupied by the back portion of the seat when in the upright configuration may become space available for the passenger's use when the back portion of the seat is in the bed configuration. The available space may be equivalent to the depth of the back portion when the back portion is in the upright seated configuration. Advantageously, the space may provide the passenger with more comfort, for example when flying long-haul. The space may be at least partially filled with a cushion when the passenger wants to sleep. The space may be located within the backshell. In the upright configuration, the back portion of the seat may be located within the backshell. The present invention may allow a greater number of aircraft seats to be installed in an aircraft.

The seat may be supported by a slider to assist with the translation of the seat between the upright configuration and the bed configuration. Advantageously, the slider may provide the seat with additional rigidity and structure. Also, the slider may improve the speed and efficiency of moving the seat between the upright configuration and the bed configuration. The slider may be made of plastics material. The slider may comprise other materials, for example fabrics such as felt, cotton, leather. Some preferable materials may allow a smoother translation of the seat.

The aircraft seat unit may comprise a handle for manually sliding the seat between the upright configuration and the bed configuration. Advantageously, there may be no need for additional mechanical devices to actuate the seat, which may save space and weight on an aircraft. The handle is simple for a passenger to pull or push the seat between the upright configuration and the bed configuration. The handle may be integrated at the free end of the seat pan portion, such that a passenger pulls the handle to slide the seat from the upright configuration to the bed configuration, and pushes the handle to slide the seat from the bed configuration to the upright configuration. The handle may be located at a free end of the back portion. The aircraft seat unit may comprise two handles, one at either free end of the seat pan portion and back portion, so that the passenger is pulling rather than pushing, or vice versa, depending on which movement is easier.

The aircraft seat unit may comprise an actuator to slide the seat between the upright configuration and the bed configuration. The actuator may be a simple linear actuator. The actuator may be controller by a passenger control unit. The passenger control unit may be integrated in the aircraft seat unit, for example in the backshell or the console. The actuator may comprise a chain or a belt drive. The actuator may comprise a screw drive. The actuator may be connected to the slider. The actuator may actuate the slider to move the seat between the upright configuration and the bed configuration.

The aircraft seat unit may comprise one or more guide slots to guide the seat between the upright configuration and the bed configuration. Advantageously, the guide slots may assist with the sliding of the seat between the upright configuration and the bed configuration. Guide slots may be integrated in a bottom part of the backshell located to a non-passenger side of the seat pan portion of the seat. The guide slots may be on the surface of the bottom part of the backshell. The guide slots may be tracks. The seat may comprise protrusions or similar that engage with and/or slide within the guide slots. The slider may be configured to run along the guide slots.

The seat may comprise a foam cushion. The foam cushion may provide comfort to the passenger. The foam cushion may be flexible allowing the seat to bend and adapt between a seat configuration where the passenger wants to sit, and a bed configuration where the passenger wants to lie for sleeping. The foam cushion may have a curved portion between the back portion and the seat pan portion when the seat is in an upright seated configuration. The seat may comprise a cover. The cover may provide additional comfort to the passenger and protect the foam cushion, for example from spillage of food or fluids. The foam cushion may comprise castellations on the non-passenger side of the seat. Advantageously, the castellations may increase the flexibility of the foam cushion and allow the back portion to deform between curved in the upright seated configuration and flat in the bed configuration. The castellations may improve airflow through the seat. The seat may comprise other materials suitable for an aircraft seat that is known to the skilled person. For example, the seat may comprise memory foam or polyethylene foam. The seat may comprise a cushion having a lattice structure. The seat may comprise springs.

The seat pan and seat back may be one integrated portion. Advantageously, having the seat pan and back portion integrated may be simpler to manufacture. The seat may be one foam cushion configured to flex when the seat is in an upright seated configuration and is straight when the seat is in a bed configuration. The back portion may have a smooth curve in the upright configuration that extends into the seat pan portion. Upon moving the seat from the upright configuration to the bed configuration, the smooth curve becomes flat, allowing a passenger to lie on the seat in the bed configuration.

The seat pan and seat back portions may comprise two separate portions attached together. The seat pan and back portions may be attached by their respective free ends with Velcro®. The seat pan and seat back portions may be separated. Separation of the seat pan and seat back portions may improve cleaning. The seat pan and back portions may be sewn together. The sewn region may act as a hinge to allow the seat to curve when the seat is in the upright seated configuration.

The aircraft seat unit may comprise a locking mechanism to lock the seat in the upright configuration and/or the bed configuration. Advantageously, the locking mechanism may prevent the seat from moving once the seat is in the passenger's required configuration. The seat unit may comprise a push-to-close locking mechanism having a hook and catch. Other similar locking mechanisms known to the skilled person may be used to prevent the seat from moving or sliding when the seat is in the upright configuration and/or the bed configuration.

According to another aspect of the invention, there is an aircraft seat arrangement comprising an aircraft seat unit according to the first aspect of the invention and a leg rest. When the seat slides from the upright configuration to the bed configuration, the free end of the seat pan portion and leg rest may abut. Advantageously, the leg rest may provide more space for the passenger when the aircraft seat is in the bed configuration. When the seat is in the upright seated configuration, there may be space between the seat unit and leg rest to allow passengers to move between them in the aircraft cabin. The leg rest may be moveable to abut with the seat in the bed configuration. The leg rest may move away from the seat unit to provide more leg room when the seat unit is in the upright configuration.

According to another aspect of the invention, there is provided a method of moving an aircraft seat unit in accordance with the first aspect of the invention from an upright configuration to a bed configuration or vice versa, the method comprising the step of sliding the seat from one configuration to the other configuration. Advantageously, the method may allow the passenger to move the seat from an upright configuration to a bed configuration simply and quickly.

The step of moving the seat may comprises manually sliding the seat. Advantageously, manual movement of the seat may allow the passenger to slide the seat between the upright and bed configurations at any time during the flight without the need for assistance, making it quick and easy for the passenger to switch between the configurations. The seat may comprise a handle located at a free end of the seat pan portion. The passenger may pull the handle to move the seat from the upright configuration to the bed configuration. The passenger may push the handle to move the seat from the bed configuration to the upright configuration. The handle may be located at a free end of the back portion. The aircraft seat unit may comprise two handles, one at each free end of the seat pan portion and back portion, so that the passenger is pulling rather than pushing, or vice versa, depending on which movement is easier.

The seat may slide within the backshell of the seat unit, such that space occupied by the back portion of the seat when in the upright configuration becomes space available for the passenger's use when the back portion is in the bed configuration. Advantageously, the additional space may provide a more comfortable experience for the passenger. The additional space may provide the aircraft cabin with space for additional seat units.

The method may comprise the step of locking the seat after moving the seat from the upright configuration to the bed configuration and/or from the bed configuration to the upright configuration. The seat unit may comprise a push-to-close locking mechanism having a hook and catch. Other similar locking mechanisms known to the skilled person may be used to prevent the seat from moving or sliding when the seat is in the upright configuration and/or the bed configuration.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
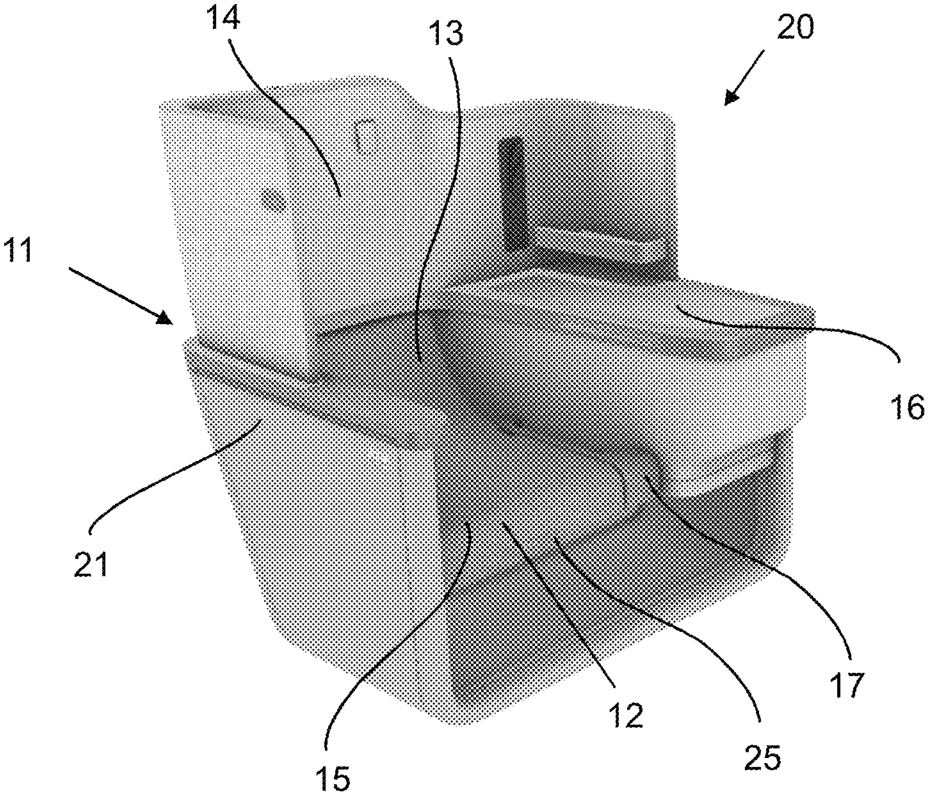
FIGS. 1*a* and 1*b* show the aircraft seat unit in an upright seated configuration.
Figure 1B:
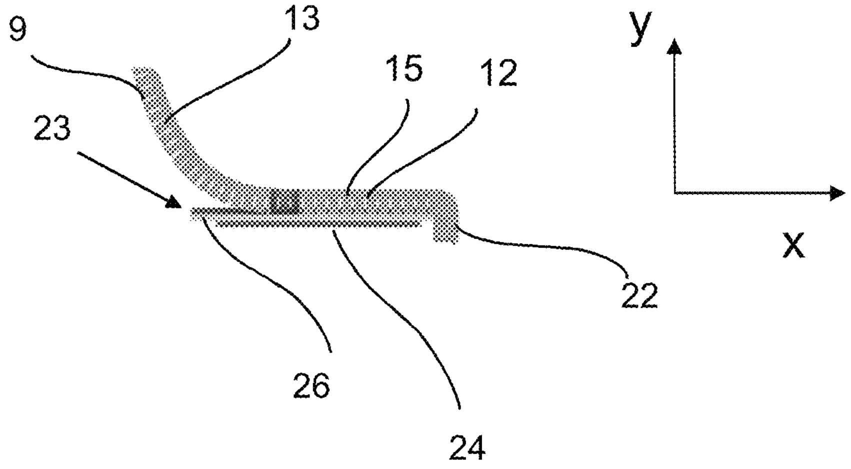

FIGS. 1*a* and 1*b* show an aircraft seat unit 20 in accordance with a first embodiment of the invention, the aircraft seat unit 20 comprising a backshell 11, which surrounds a seat 12 that is translatable between an upright seated configuration and a bed configuration. In the upright seated configuration the seat 12 has a pan portion 15 which provides a sitting surface to a passenger and also a back portion 13 which provides an upright back support. In the bed configuration the seat 12 provides a flat surface for a passenger to lie on. The aircraft seat unit 20 also includes a passenger table 16. The backshell 11 has an upper panel 14 which is located at the upper part of the aircraft seat unit 20 and provides the passenger with privacy. The backshell 11 also has a base 21 which surrounds the seat 12 and passenger table 16. The seat pan portion 15 and back portion 13 are seamlessly connected together. The seat 12 has a rectangular shape when in the bed configuration and comprises a foam material enclosed in a seat cover. When in the upright configuration, the back portion 13 includes a smooth curve which supports the back of a passenger, the smooth curve extending from the flat seat pan portion 15. The foam provides the seat 12 with rigidity and comfort for a passenger sitting or lying down in the seat 12, and is flexible such that the seat 12 curves where the seat pan portion 15 joins the seat back portion 13 when the seat 12 is in the seated configuration. As shown better in FIGS. 1*b* and 2*b*, the non-passenger side of the foam has castellations 9. The castellations 9 improve the flexibility of foam cushion and allow the back portion 13 to deform between curved in the upright seated configuration and flat in the bed configuration. The castellations 9 may be grooves in the non-passenger side of the foam.

The seat cover protects the internal foam material from any damage or accidents. The seat cover may comprise any material that is typically used for aircraft seat covers, for example leather, cotton, polyester, and/or nylon. The seat cover is removable to allow cleaning, or to allow replacement by different seat covers depending on the airline using the aircraft seat units 20. Advantageously, the material of the seat cover can assist with the sliding of the seat 12 when the seat 12 is translated from the upright configuration to the bed configuration.

FIG. 1*b* shows a cross sectional view of the seat portion 12 in the upright configuration, comprising the seat 12 mounted on a slider 23. The slider 23 has two slidable plates: top plate 26 and bottom plate 24. The bottom plate 24 is mounted to the base 21 of the backshell 11, and the top plate 26 is configured to slide relative to the bottom plate 24. The seat pan portion 15 of the seat 12 is connected to the top plate 26, such that when the top plate 26 slides relative to the bottom plate 24, the seat 12 will follow. In the present embodiment, the seat 12 has a lip 22 located at the end of the seat pan portion 15. On the lip, there is a handle 25 to manually slide the top plate 26 and the seat 12 relative to the bottom plate 24. The handle 25 is described in more detail with reference to FIG. 4 below.

Figure 2A:
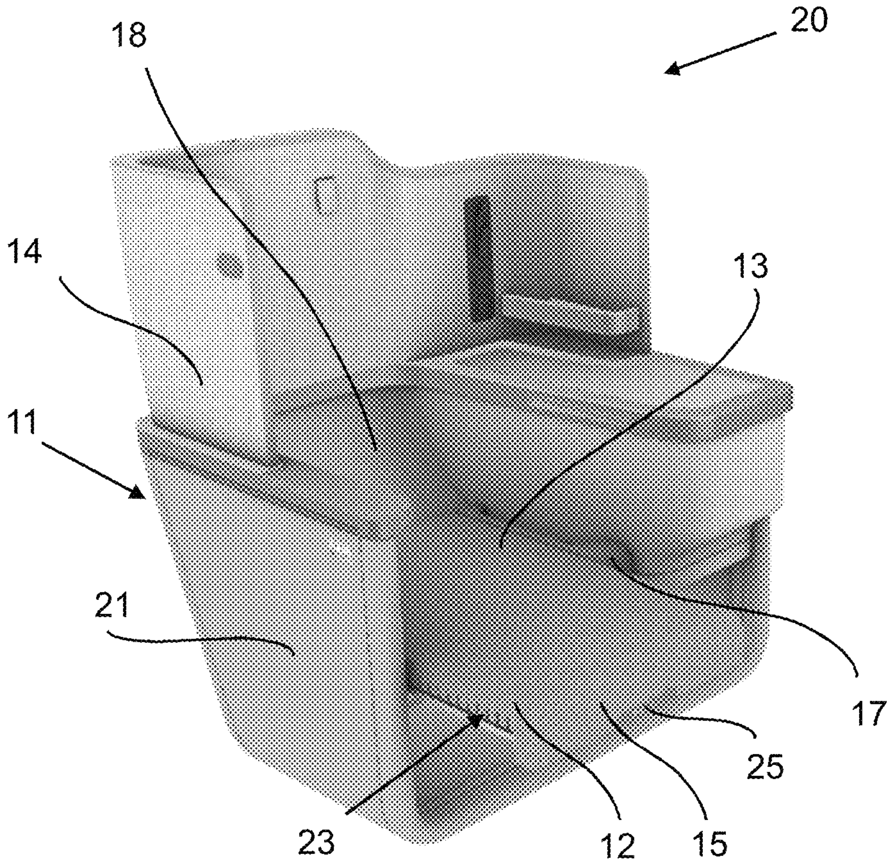
FIGS. 2*a* and 2*b* show the aircraft seat unit in a bed configuration.
Figure 2B:
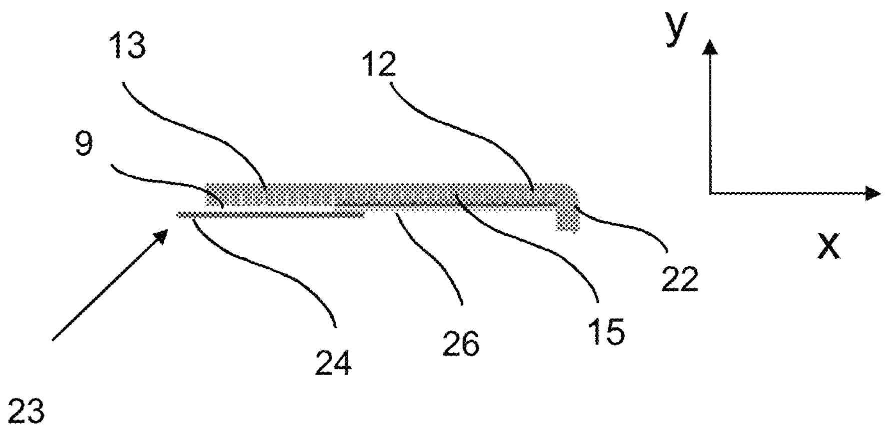

FIG. 2*a* shows the aircraft seat unit 20 in a bed configuration. The aircraft seat unit 20 in the bed configuration as shown in FIGS. 2*a* and 2*b* have the same features and thus the same reference numbers as the embodiment shown in FIGS. 1*a* and 1*b* where the seat is in an upright seated configuration. As described above, the aircraft seat unit 20 has a backshell 11, which surrounds the translating seat 12 and the passenger table 16. In the present configuration, the seat 12 has moved such that the seat 12 exposes a rear part 18 of the base 21 of the backshell 11. Advantageously, when the seat 12 is moved to the bed configuration, the volume of space that was previously occupied by the seat back portion 13 provides extra space 31 for the passenger.

The rear part 18 comprises a plastics material to provide robustness and rigidity to withstand the weight of a passenger. The plastics material is chosen to have a low coefficient of friction so that the seat 12 can slide easily along the rear part 18 of the base 21. The rear part is curved to support the back portion 13 when the seat 12 is in the upright seated configuration. The rear part 18 may comprise a fabric material cover, for example felt or leather, to improve the sliding motion of the back portion 13 of the seat 12 relative to the rear part 18.

FIG. 2*b* shows a cross sectional view of the seat 12 in the bed configuration, comprising the seat 12 mounted on the slider 23, wherein the top plate 26 has moved relative to the bottom plate 24. As previously mentioned with reference to FIG. 1*b*, the seat 12 has a lip 22 at the end of the seat pan portion 15, which has a handle 25 to manually slide the top plate 26 and the seat 12 relative to the bottom plate 24. In the bed configuration, the back portion 13 and the pan portion 15 of the seat 12 are aligned along a horizontal axis, x, relative to the backshell 11 to form a flat surface for a passenger to lie on.

Figure 3A:
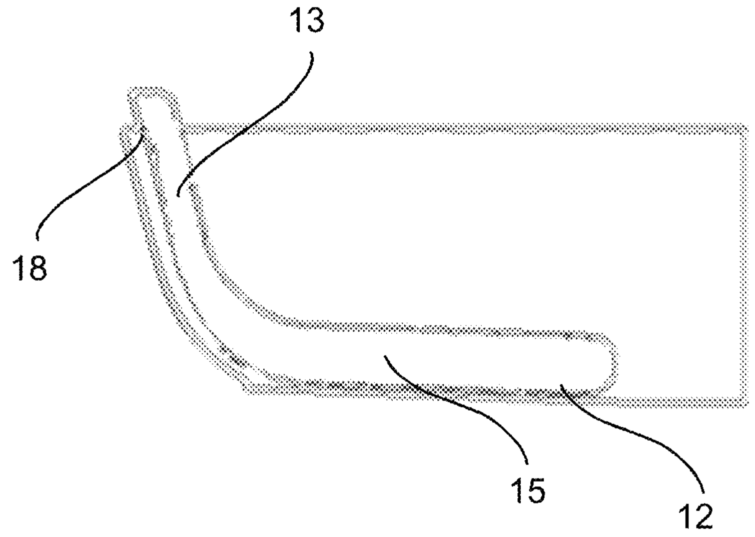
FIGS. 3*a* and 3*b* show a partial cross sectional view of the aircraft seat unit.
Figure 3B:
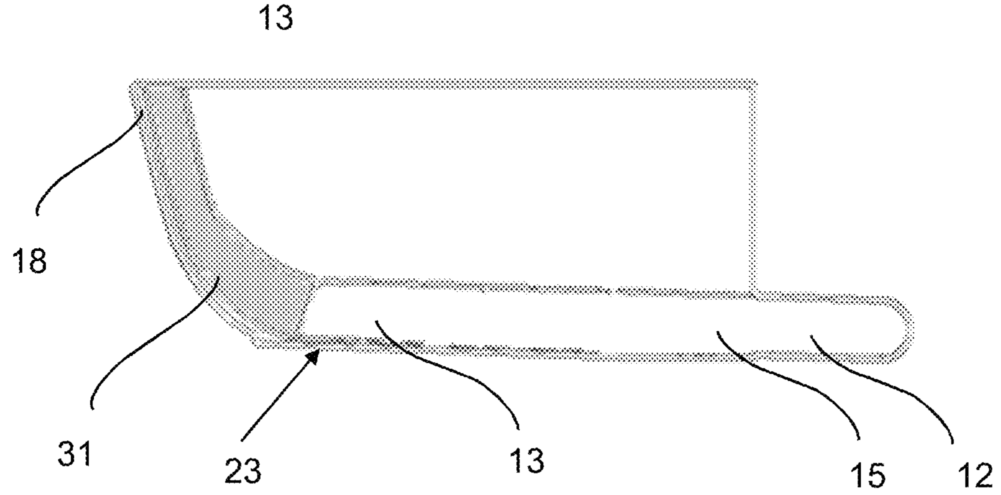

FIGS. 3*a* and 3*b* show a partial cross sectional view of the seat 12 and the additional space created upon sliding the seat 12 from the upright configuration to a bed configuration. As described above with reference to FIGS. 1*a*, 1*b*, 2*a*, and 2*b*, the seat 12 slides from the upright configuration (as shown in FIG. 3*a*) to the bed configuration (as shown in FIG. 3*b*) along slider 23. When the seat 12 is moved from the upright configuration to the bed configuration as shown in FIG. 3*b*, the aircraft seat unit has extra space 31 that is equivalent to the depth of the backrest portion 15 of the seat 12. Advantageously, the passenger has more space when they are lying on the seat 12 to sleep. The passenger may position a pillow (not shown) within the extra space for comfort.

Figure 4:
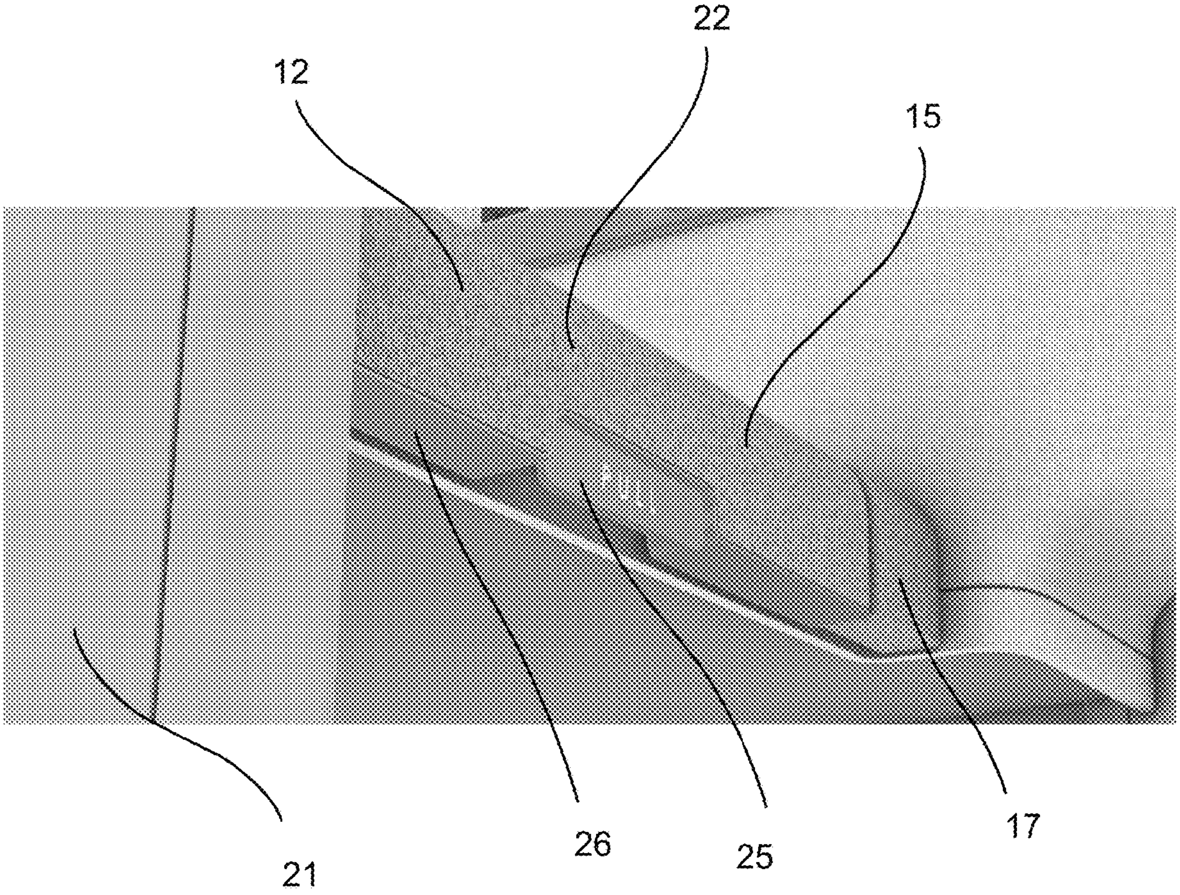
FIG. 4 shows an enlarged view of a handle of the aircraft seat unit.

FIG. 4 shows an enlarged view of the lip 22 of the seat 12. As mentioned above, the lip 22 is located at the end of the seat pan portion 15 of the seat 12. At the centre of the lip 22 there is a handle 25, which is connected to the top plate 26 of the slider 23 so that a passenger can manually move the seat 12 between an upright configuration and a bed configuration. In the present embodiment, when the passenger pulls the handle 25 along the horizontal axis, x, relative to the backshell 11 of the seat unit 20, the top plate 26 of the slider 23 and the seat 12 moves away from the backshell 11. The seat back portion 13 slides along and away from the rear portion 18 until the seat back 13 and seat pan 15 are both oriented horizontal with respect to the backshell 11 and forms a flat surface for the passenger to lie on.

The aircraft seat unit 20 comprises one or more guide slots or rails 17 to assist the sliding of the seat 12. In the present embodiment, the guide slots 17 are arranged on the inner surface of the base 21 of the backshell 11 either side of the seat 12. The guide slots 17 are arranged to hold the outermost sides of the top plate 26 of the slider 23 to assist with the sliding motion of the top plate 26 and to increase robustness of the aircraft seat unit 20 when a passenger is sitting or lying on the seat 12.

Figure 5A:
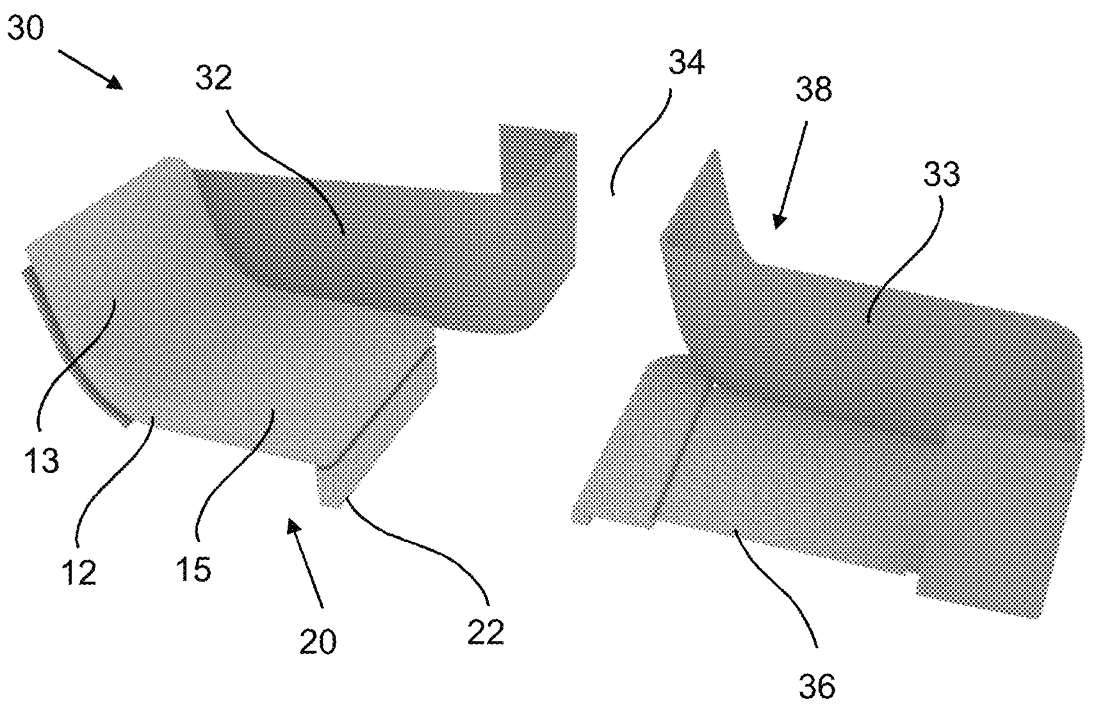
FIGS. 5*a* and 5*b* show an aircraft seat arrangement in accordance with a second embodiment of the present invention in a seated configuration and a bed configuration.
Figure 5B:
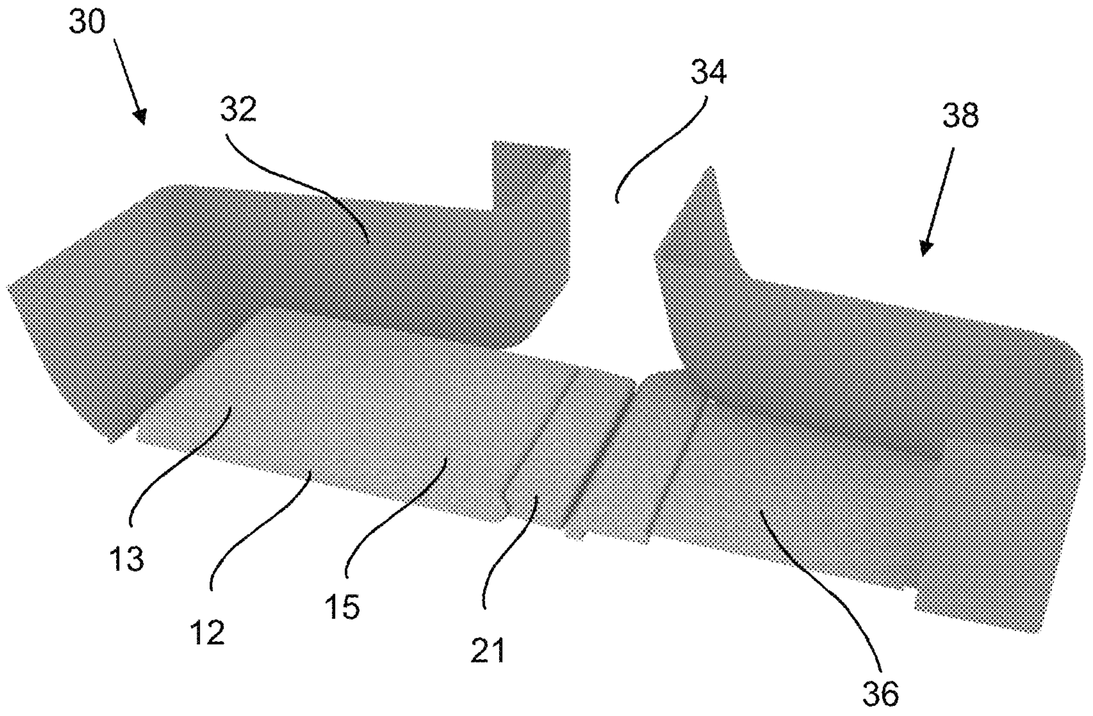

FIGS. 5*a* and 5*b* show an example of an aircraft seat arrangement 30 in accordance with a second embodiment of the present invention comprising an aircraft seat unit 20 and a leg rest 38. The aircraft seat unit 20 is the same as the aircraft seat unit of the first embodiment, apart from side panel 32 which is arranged on the side of the seat 12 and forms part of a walkway within an aircraft cabin. The leg rest 38 also has a side panel 33 that forms part of the walkway within an aircraft cabin, and a cushion portion 36 arranged horizontal with respect to the side panel 33.

In FIG. 5*a*, the aircraft seat unit 20 is in the upright seated configuration. Between the aircraft seat unit 20 and the leg rest 38, there is a gap 34 to allow passenger access to and from the seat arrangement 30. FIG. 5*b* shows the aircraft seat unit 20 in the bed configuration where the seat 12 has been moved to a bed configuration and is aligned with the cushion portion 36 of the leg rest 38. In the present embodiment, the lip 22 can rotate by 90 degrees upwards to bridge a gap between the end of the pan portion 15 of the seat 12 and a free end of the cushion 36 of the leg rest 38. In the bed configuration, the aircraft seat unit 20 and the leg rest 38 block the gap 34. The leg rest 38 provides more space for the passenger to lie comfortably when they need to sleep, for example, on long-haul flights.

Figure 6:
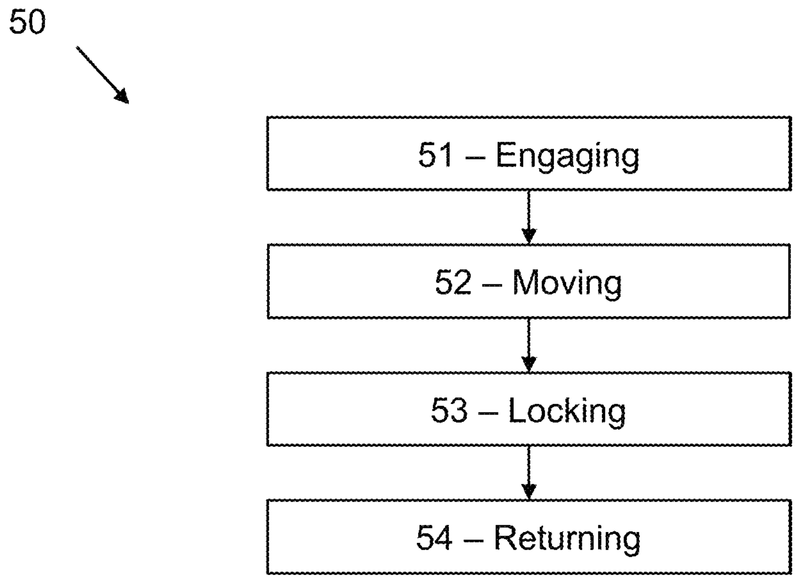
FIG. 6 shows steps of a method of using the aircraft seat arrangement in accordance with the first embodiment.

FIG. 6 shows the steps taken to move an aircraft seat unit in accordance with the first embodiment. The method 50 of moving the aircraft seat unit comprising the step of engaging a handle 25 of the seat (step 52). The handle 25 as shown in FIG. 5, is connected to the top plate 26 of the slider 23. The next step is moving the seat from the upright configuration to the bed configuration (step 52). When a passenger engages with the handle 25 and pulls the handle 25 away from the backshell 11, the top plate 26 and seat 12 moves the seat from the upright configuration to the bed configuration. The seat 12 can be locked in the bed configuration to prevent the seat 12 and top plate 26 sliding unintentionally, for example when the aircraft is moving (step 53). The seat 12 may have a push-to-close locking mechanism (not shown) such that when the seat 12 has been moved to the bed configuration, the seat can be pushed into a catch to lock the seat in place.

When the seat is in the bed configuration, the passenger can lie on the seat 12, with additional space for the passenger in the area where the back portion 13 of the seat 12 was positioned when the seat is in the upright configuration. When the passenger wants to sit in the seat, the passenger can return the seat 12 from the bed configuration to the upright configuration (step 54). The passenger can unlock the seat and push the handle 25 to move the seat 12 and top plate 26 back to the upright configuration. The back portion 13 of the seat 12 will slide along the rear portion 18 of the backshell 11. As previously mentioned, the material of the seat 12 allows the seat 12 to curve and be molded into the desired seat shape as well as provide comfort to the passenger when sitting and/or lying down. The seat can be locked in the upright configuration to prevent the seat 12 and top plate 26 from sliding unintentionally, for example when the aircraft is moving. A push-to-close locking mechanism may be provided for locking the seat 12 when the seat 12 is in the upright configuration.

Figure 7A:
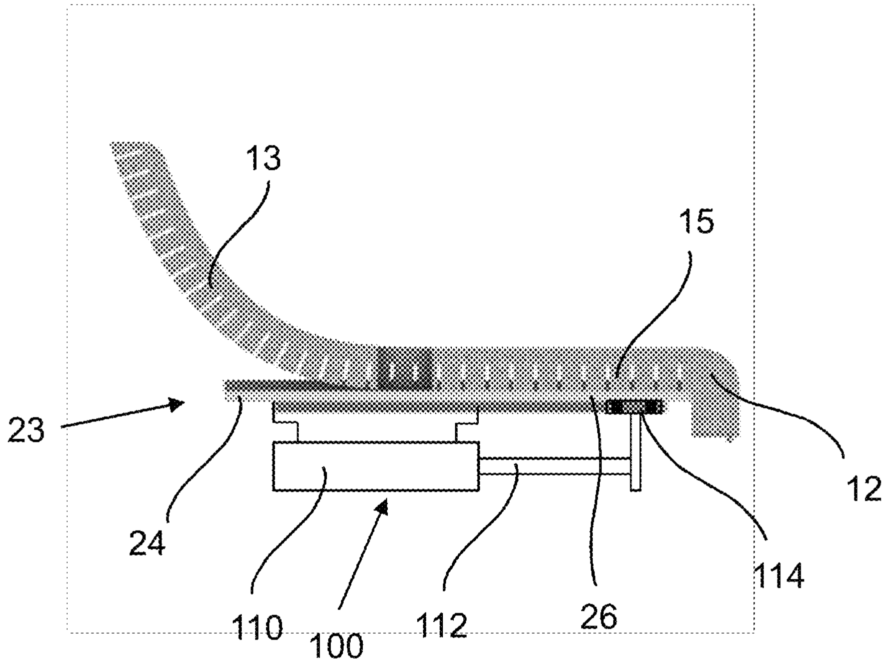
FIGS. 7*a* and 7*b* show an alternative embodiment of an aircraft seat unit comprising an actuator.
Figure 7B:
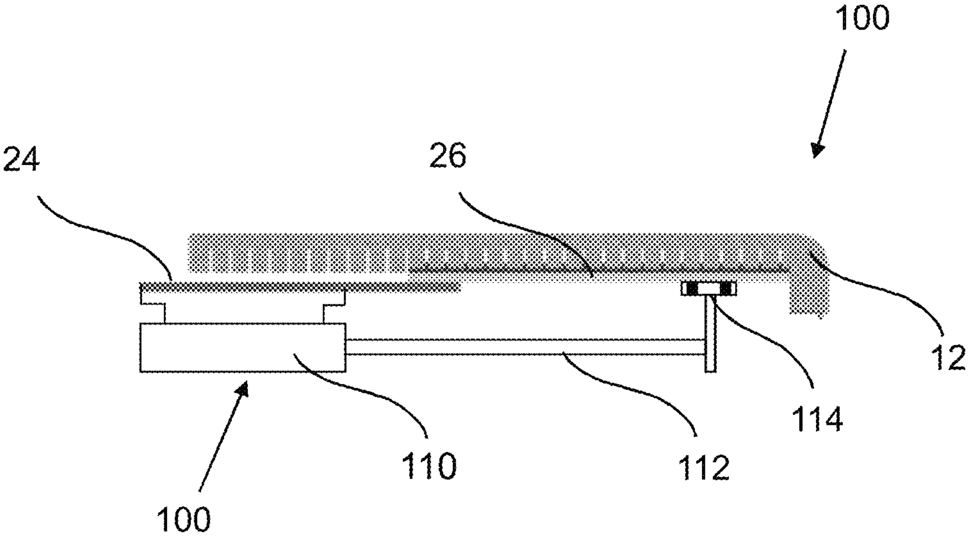

In an alternative embodiment as shown in FIGS. 7*a* and 7*b*, the aircraft seat unit 20 in accordance with the first embodiment and with reference to FIGS. 1*a*, 1*b*, 2*a*, and 2*b* comprises an actuator 100 to slide the seat 12 between the upright seated configuration (as shown in FIG. 7*a*) and the bed configuration (as shown in FIG. 7*b*). The actuator 100 in the present embodiment is a linear actuator 100 integrated within the base 21 of the backshell 11 of the aircraft seat unit 20. The linear actuator 100 is attached to the bottom plate 24 where it is fixed relative to the top plate 26 of the slider 23. The linear actuator 110 has a body 110 and an arm 112 that extends away from the body 110, and a bearing 114 that is connected to the top plate 26 of the slider 23. Upon actuating the actuator 100, the actuator 100 moves the top plate 26 of the slider 23 to slide the seat 12 between the upright seated configuration (as shown in FIG. 7*a*) and the bed configuration (as shown in FIG. 7*b*).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The guide slots 17 as shown better in FIG. 4 may be integrated in the backshell 11. At least one guide slot 17 may be mounted on the side of the passenger table or console 16. The guide slots may be tracks. The tracks may comprise rollers that assist with the sliding of the slider 23.

The linear actuator 100 as shown in FIGS. 7*a* and 7*b* may be connected to a passenger control unit (not shown). The passenger control unit may be integrated in the console unit or table. The passenger control unit may comprise buttons which allow the passenger to control the sliding of the seat 12 between the upright configuration and bed configuration.

In an alternative embodiment of the method as shown in FIG. 6, the method may comprise the step of actuating an actuator. The actuator may move the seat 12 from the upright seated configuration to a bed configuration. The seat 12 may be locked in the bed configuration by a locking mechanism, for example a push-to-close locking mechanism. When the passenger wants to sit upright, the seat may be unlocked, and the actuator may be actuated to return the seat 12 from the bed configuration to the upright seated configuration. The actuator may be a linear actuator.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft seat unit comprising:

a backshell; and a seat, wherein the seat comprises a seat pan portion connected to a back portion, wherein the backshell comprises a rear curved panel to support the back portion of the seat, wherein the seat comprises a flexible foam cushion, and the seat is configured to slide along the rear curved panel of the backshell between an upright configuration, where a passenger can sit on the seat pan portion in a sitting position with their back supported by a curved portion between the back portion and the seat pan portion, and a bed configuration, where the curved portion extends flat such that the passenger can lie on the seat pan portion and seat back portion.

2. An aircraft seat unit according to claim 1, wherein space occupied by the back portion of the seat when in the upright configuration becomes space available for the passenger's use when the back portion is in the bed configuration.

3. An aircraft seat unit according to claim 1, wherein the seat is supported by a slider to assist with translation of the seat between the upright configuration and the bed configuration.

4. An aircraft seat unit according to claim 1, comprising a handle for manually sliding the seat between the upright configuration and the bed configuration.

5. An aircraft seat unit according to claim 1, comprising an actuator to slide the seat between the upright configuration and the bed configuration.

6. An aircraft seat unit according to claim 1, comprising one or more guide slots to guide the seat between the upright configuration and the bed configuration.

7. An aircraft seat unit according to claim 1, wherein the seat pan and seat back is one integrated portion.

8. An aircraft seat unit according to claim 1, wherein the seat pan and seat back comprise two separate portions attached together.

9. An aircraft seat arrangement comprising an aircraft seat unit according to claim 1 and a leg rest.

10. A method of moving an aircraft seat unit according to claim 1 from an upright configuration to a bed configuration or vice versa, the method comprising the step of:

sliding the seat along the rear curved panel of the backshell from one configuration to the other configuration.

11. A method of moving an aircraft seat unit according to claim 10, wherein the step of sliding the seat comprises manually sliding the seat.

12. A method of moving an aircraft seat unit according to claim 10, wherein the seat slides along the rear curved panel of the backshell of the seat unit, such that space occupied by the back portion of the seat when in the upright configuration becomes space available for the passenger's use when the back portion is in the bed configuration.

13. A method of moving an aircraft seat unit according to claim 10 comprising the step of locking the seat when the seat is in the upright configuration and/or in the bed configuration, and unlocking the seat for moving the seat from one configuration to the other configuration.

* * * * *